Sept. 16, 1958　　　　E. C. ETTEMA　　　　2,851,748
DETACHABLE JOINT OF STRUCTURAL PARTS
Filed July 2, 1954
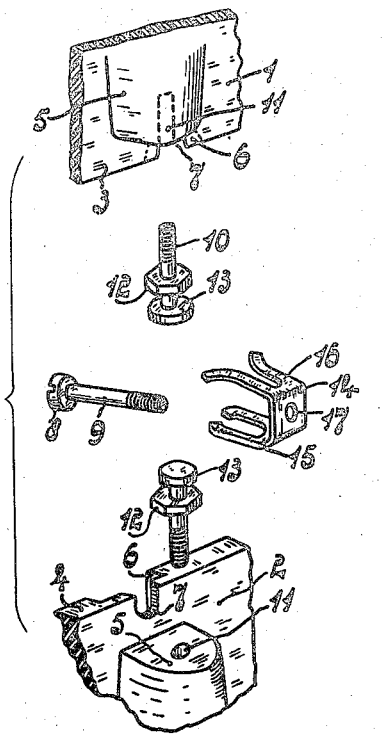
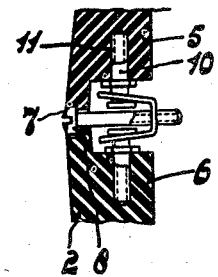
INVENTOR.
EVERHARDUS CATHARINUS ETTEMA
BY
AGENT United States Patent Office 2,851,748
Patented Sept. 16, 1958

2,851,748

DETACHABLE JOINT OF STRUCTURAL PARTS

Everhardus Catharinus Ettema, Drachten, Netherlands, assignor, by mesne assignments, to North American Philips Company, Inc., New York, N. Y., a corporation of Delaware Application July 2, 1954, Serial No. 440,981

Claims priority, application Netherlands July 10, 1953

2 Claims. (Cl. 20—92)

The invention relates to detachable joints of structural parts, the head surfaces of which are adjacent one another in the joint. Such parts may be joined together by means of screw bolts from without, as is common practice to do with flanges, but in this case projecting parts are left on the outer side, which may sometimes be inconvenient. As an alternative straps may be provided both on the inner side and on the outer side, these straps engaging the material by hooks and being joined by a screw bolt, but even in this case it is not quite possible to obtain a smooth outer surface. Moreover, if the inner side of the parts to be joined has become inaccessible after the parts have been joined together, the known connecting means may sometimes give rise to difficulties.

The invention has for its object to avoid the aforesaid disadvantages of the known connecting means and is characterised in that at each point of joining each of the parts is provided with pin-shaped, headed members extending transversely to the head surface and in that provision is made of a coupling piece having a flat section with fork-shaped parts extending substantially at right angles thereto, each of the fork-shaped parts embracing one of the pin-shaped members behind the head and a screw bolt tightening coupling piece from without. It is thus possible to obtain readily a cheap joint, the outer side of which need not have projecting parts. The latter is of particular importance if the parts to be joined are to be worked subsequently, for instance to be ground and polished.

In an advantageous embodiment of the invention at least one of the fork-shaped parts is bent resiliently with its teeth about a pin-shaped member, whilst the teeth of all other fork-shaped members are bent away from one another in the form of a V. This embodiment is of particular importance, if after they have been placed against one another the parts to be joined are inaccessible from within, since in this case the coupling piece is held in place by a resilient part on a pin, whilst the other pins occupy compulsorily their correct positions, their heads being passed between the teeth bent away from one another.

The invention will now be described with reference to the accompanying drawing, in which Fig. 1 shows the various parts of the joint separately and Fig. 2 shows an established joint. The two figures show constructions to be considered as examples.

Reference numerals 1 and 2 designate two parts to be joined to one another with their head surfaces 3 and 4 adjacent one another. The two parts, which may, for example be pressed from thermo-hardening synthetic resin are provided on the inner side with lugs 5. They exhibit moreover each two semi-circular recesses 6 and 7, in which fit a head 8 and a body 9 respectively of a screw bolt. Two threaded pins 10, adapted to be introduced into holes 11, have each a shoulder 12 and a head 13. Finally provision is made of a coupling piece 14, which has two fork-shaped parts 15 and 16. The teeth of the fork-shaped part 15 are bent towards one another in a resilient manner, whereas the teeth of the fork-shaped part 16 are bent away from one another in the form of a V. The coupling piece is furthermore provided with a threaded hole 17, in which fits the screw thread of the bolt 9.

If the parts 1 and 2 are to be joined, first the pins 10 are screwed into the holes 11. As an alternative, these pins may be obtained during moulding, if the parts 1 and 2 are moulded pieces. Then the coupling piece 14 with the part 15 is arranged about the pin 10 between the shoulder 12 and the head 13, then part 1 is put on part 2, the shoulder 12 and the head 13 of the pin 10 engaging between them the V-shaped part 16, the teeth of which are bent away from one another at the end to such an extent that the head 13 can pass between them. The screw bolt 9, which may be provided previously, is then tightened to such an extent that the coupling piece attracts the parts 1 and 2 against one another. The head 8 of the bolt 9 does not project beyond the surfaces of the parts 1 and 2, so that the latter may, if desired, be worked subsequently. It is evident that even if the inner side of the parts 1 and 2 is inaccessible subsequent to mounting, the joint may be established in a simple manner, since the coupling piece is held in position by the part 15 and the V-shaped part 16 engages the pin 10, so that the latter occupies the correct position. Moreover, the joint may be readily disengaged.

If more than two parts are to be joined, the coupling piece must have as many fork-shaped parts as there are parts to be joined; however, only one fork-shaped part need be bent resiliently with its teeth about a pin; the teeth of the further fork-shaped parts may be bent away from one another in the form of a V.

What is claimed is:

1. A detachable joint for two abutting structural parts comprising a lug and an adjacent groove on each of said parts, each of said lugs having an aperture aligned with an opposed aperture, a pin-shaped, headed member removably secured in each of said apertures and extending substantially transverse to the abutting surfaces of said structural parts, a coupling element having a flat portion with a hole therein and a plurality of fork-shaped parts extending substantially perpendicular to said flat portion, each of said fork-shaped parts engaging said separate pin-shaped, headed member adjacent to the head thereof, and a bolt passing through said grooves and removably secured in the hole of said coupling element to thereby fasten said two structural parts together.

2. A detachable joint as set forth in claim 1 wherein at least one of said fork-shaped parts has resilient tines which are bent toward each other and contain one of said pin-shaped, headed members therebetween while the remaining fork-shaped parts have tines which are bent away from each other.

References Cited in the file of this patent

UNITED STATES PATENTS

| 365,427 | Berge | June 28, 1887 |
| 1,503,622 | Bachmann | Aug. 5, 1924 |
| 2,442,184 | Summers | May 25, 1948 |